(12) United States Patent
Oribe et al.

(10) Patent No.: US 10,611,696 B2
(45) Date of Patent: Apr. 7, 2020

(54) POROUS CERAMIC STRUCTURE

(71) Applicant: NGK Insulators, Ltd., Nagoya (JP)

(72) Inventors: Akinobu Oribe, Kakamigahara (JP); Takahiro Tomita, Chita (JP); Hiroharu Kobayashi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/869,611

(22) Filed: Jan. 12, 2018

(65) Prior Publication Data
US 2018/0134631 A1    May 17, 2018

Related U.S. Application Data

(63) Continuation of application No. PCT/JP2016/066507, filed on Jun. 2, 2016.

(30) Foreign Application Priority Data

Jul. 16, 2015 (JP) .................................. 2015-141897
Dec. 2, 2015 (JP) .................................. 2015-235495

(51) Int. Cl.
*C04B 38/06* (2006.01)
*B28B 11/14* (2006.01)
(Continued)

(52) U.S. Cl.
CPC .......... *C04B 38/0074* (2013.01); *B28B 11/14* (2013.01); *B28B 11/145* (2013.01); *C04B 35/48* (2013.01); *C04B 35/486* (2013.01); *C04B 35/6261* (2013.01); *C04B 35/6342* (2013.01); *C04B 38/009* (2013.01); *C04B 38/0054* (2013.01); *C04B 38/067* (2013.01); *C04B 38/085* (2013.01); *C04B 41/83* (2013.01); *C04B 38/065* (2013.01); *C04B 2103/42* (2013.01); *C04B 2111/00465* (2013.01);
(Continued)

(58) Field of Classification Search
None
See application file for complete search history.

(56) References Cited

U.S. PATENT DOCUMENTS

2003/0114293 A1* 6/2003 Mizuno ................ B01D 39/201
501/80
2006/0177629 A1* 8/2006 Kunieda ............ B01D 39/2086
428/116
(Continued)

FOREIGN PATENT DOCUMENTS

JP    54-013621 A1    2/1979
JP    2004-010903 A1    1/2004
(Continued)

OTHER PUBLICATIONS

International Search Report and Written Opinion (Application No. PCT/JP2016/066507) dated Aug. 2, 2016.

*Primary Examiner* — Ronak C Patel
(74) *Attorney, Agent, or Firm* — Burr & Brown, PLLC

(57) ABSTRACT

A porous ceramic structure has a porous ceramic aggregate configured from a plurality of porous ceramic particles, and the ratio of the number of corners at locations where two other porous ceramic particles are facing a corner of a porous ceramic particle with respect to the number of corners of the porous ceramic particles included in the porous ceramic aggregate is 80% or greater.

5 Claims, 13 Drawing Sheets

(51) Int. Cl.
  *C04B 38/00*  (2006.01)
  *C04B 35/486*  (2006.01)
  *C04B 35/626*  (2006.01)
  *C04B 35/634*  (2006.01)
  *C04B 41/83*  (2006.01)
  *C04B 35/48*  (2006.01)
  *C04B 38/08*  (2006.01)
  C04B 103/42  (2006.01)
  C04B 111/00  (2006.01)

(52) U.S. Cl.
  CPC .. *C04B 2201/32* (2013.01); *C04B 2235/3225* (2013.01); *C04B 2235/6025* (2013.01); *C04B 2235/6567* (2013.01); *C04B 2235/77* (2013.01); *C04B 2235/9607* (2013.01); *C04B 2237/348* (2013.01)

(56) References Cited

U.S. PATENT DOCUMENTS

| | | | |
|---|---|---|---|
| 2012/0009412 A1 | 1/2012 | Iwai et al. | |
| 2012/0152597 A1* | 6/2012 | Yamada | B23K 1/0016 174/257 |
| 2015/0104626 A1* | 4/2015 | Tomita | C09D 1/00 428/213 |
| 2015/0274547 A1* | 10/2015 | Smith | C02F 1/003 210/767 |

FOREIGN PATENT DOCUMENTS

| | | |
|---|---|---|
| JP | 2010-064945 A1 | 3/2010 |
| JP | 2010-155946 A1 | 7/2010 |

\* cited by examiner

● : 20 (Ne)
○ : 13 (Na)
△ : 4

● : 34 (Ne)
○ : 58 (Na)
△ : 4

●: 28 (Ne)
○: 0 (Na)
△: 36

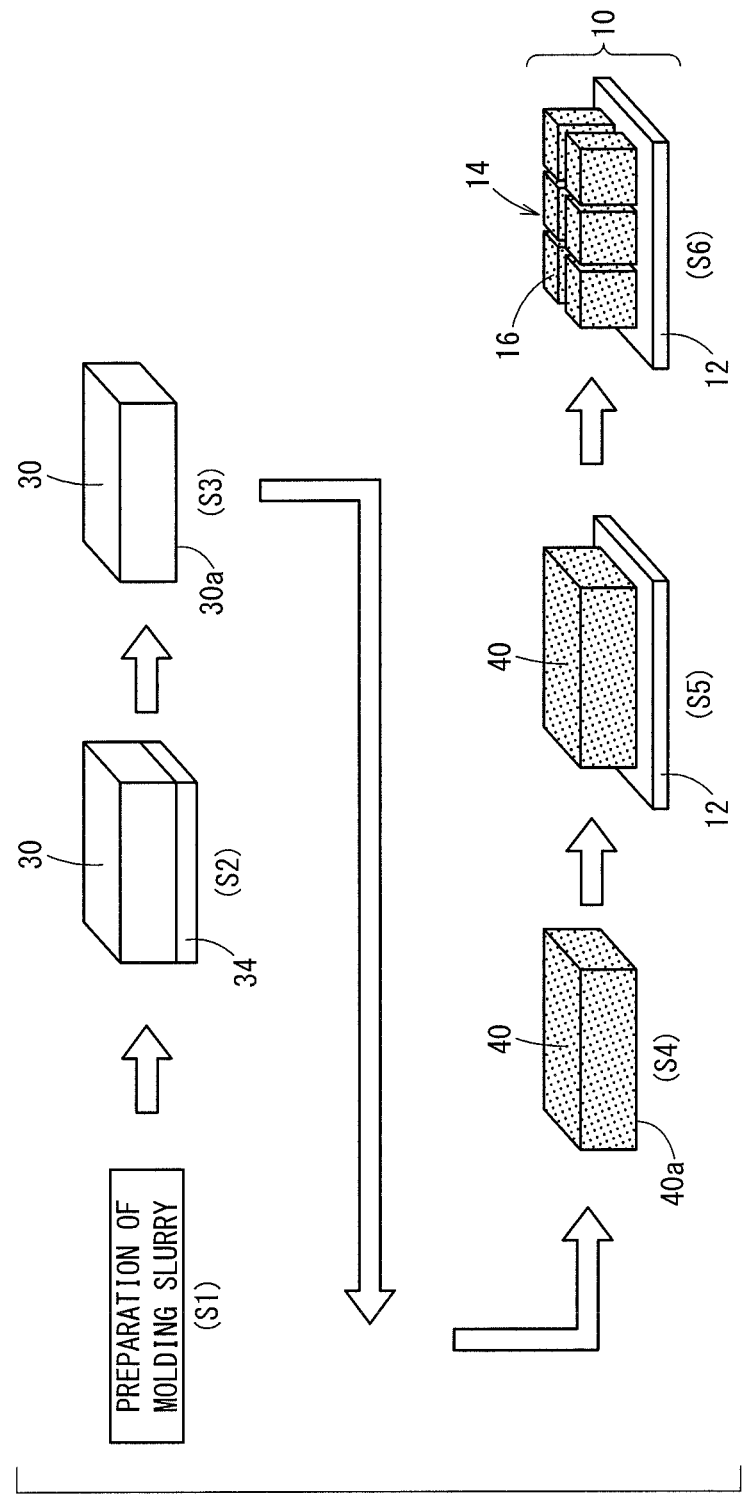

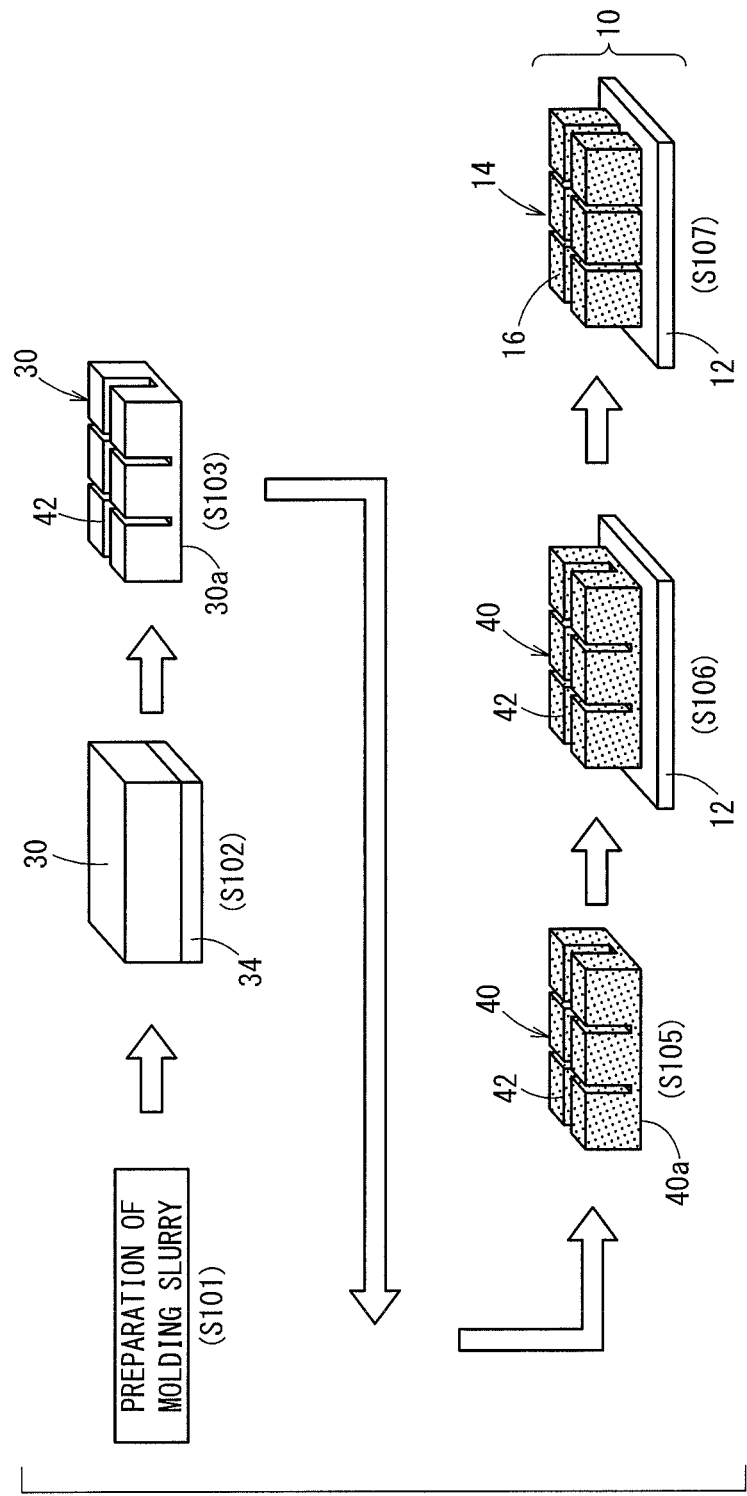

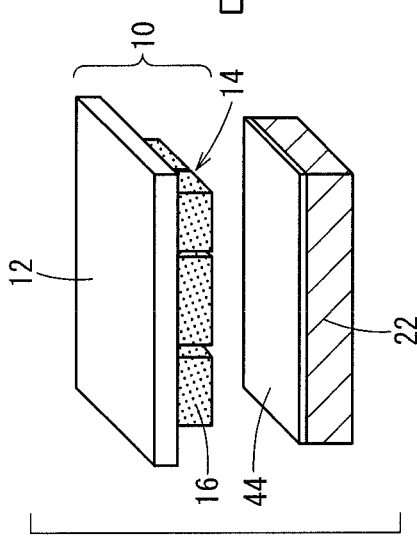
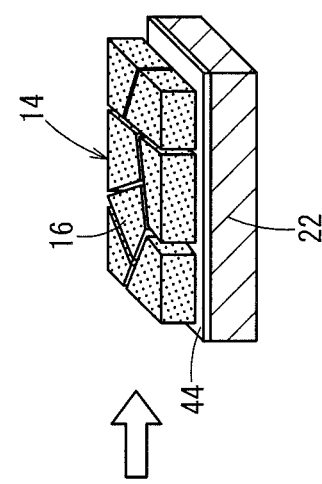
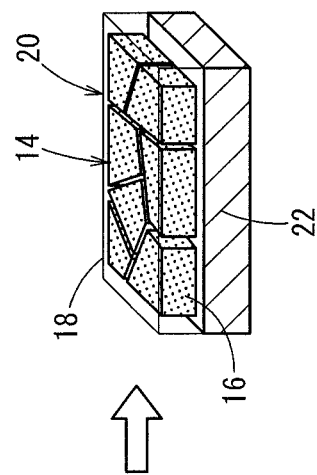

POROUS CERAMIC STRUCTURE

CROSS-REFERENCE TO RELATED APPLICATIONS

This application is a Continuation of International Application No. PCT/JP2016/066507 filed on Jun. 2, 2016, which is based upon and claims the benefit of priority from Japanese Patent Applications No. 2015-141897 filed on Jul. 16, 2015 and No. 2015-235495 filed on Dec. 2, 2015, the contents all of which are incorporated herein by reference.

BACKGROUND OF THE INVENTION

Field of the Invention

The present invention relates to a porous ceramic structure, and more particularly relates to a porous ceramic structure suitable for achieving a reduction in thermal conductivity of a component containing the porous ceramic structure.

Background Art

As a filler that is filled in a heat insulating material or a film, compositions and hollow particles and the like have been described in Japanese Laid-Open Patent Publication No. 2010-155946, Japanese Laid-Open Patent Publication No. 2004-010903, and Japanese Laid-Open Patent Publication No. 2010-064945.

Japanese Laid-Open Patent Publication No. 2010-155946 describes a curable organopolysiloxane composition, which is capable of forming a porous organopolysiloxane cured product having low thermal conductivity.

Japanese Laid-Open Patent Publication No. 2004-010903 describes the formation of a film having low thermal conductivity, by using a coating material in which hollow particles with low thermal conductivity are used.

Japanese Laid-Open Patent Publication No. 2010-064945 discloses a method in which additive particles are adsorbed on surfaces of base particles by an electrostatic interaction, thereby producing nanocoated composite particles, and further manufacturing a composite material through an ordinary powder metallurgy process by use of the composite particles.

SUMMARY OF THE INVENTION

With the technology described in Japanese Laid-Open Patent Publication No. 2010-155946 and Japanese Laid-Open Patent Publication No. 2004-010903, the reduction in thermal conductivity is insufficient. With the technology described in Japanese Laid-Open Patent Publication No. 2010-064945, since it is intended to manufacture a composite material by powder metallurgy, it is kept in mind that fine particles with a particle diameter on the order of nanometers (nm) are coated on the base particles. Therefore, the distance between the base particles becomes short, and in this case as well, the reduction in thermal conductivity is insufficient.

If the particles added to the adhesive are small, it is difficult to uniformly disperse the particles in the adhesive. Further, since it is necessary to fire an adhesive to which particles have been added in advance to form a bulk body, and thereafter place the adhesive on the object, for example, it becomes difficult to place the adhesive in a partial area of the object, and it is difficult to place the adhesive along a complex shape.

The present invention has been made in consideration of the aforementioned problems, and has the object of providing a porous ceramic structure, in which it is possible to achieve low thermal conductivity, together with installing the porous ceramic structure directly on an object using an adhesive or the like, and further, it is possible to facilitate installation of a bulk body.

[1] A porous ceramic structure according to the present invention includes a porous ceramic aggregate including at least a plurality of porous ceramic particles wherein a percentage of the number of corners at places where a corner of a porous ceramic particle faces two other porous ceramic particles, with respect to the number of corners of the porous ceramic particles contained in the porous ceramic aggregate is 80% or more.

[2] In the present invention, $Na/(Nz-Ne) \times 100(\%) \geq 80(\%)$ where Nz is a total number of corners of all the porous ceramic particles contained in the porous ceramic aggregate, Na is the number of corners at places where a corner of a porous ceramic particle faces two other porous ceramic particles within the porous ceramic aggregate, and Ne is the number of corners located on a peripheral portion of the porous ceramic aggregate.

[3] In the present invention, $Na/(Nz-Ne) \times 100(\%) \geq 90(\%)$.

[4] In the present invention, one sheet and the porous ceramic aggregate bonded on the sheet are included.

[5] In the present invention, a porosity of the porous ceramic particles preferably is 20% to 99%.

[6] In the present invention, the porous ceramic particles preferably have an average pore diameter of less than or equal to 500 nm.

[7] In the present invention, a thermal conductivity of the porous ceramic particles preferably is less than 1.5 W/mK.

[8] In the present invention, a heat capacity of the porous ceramic particles preferably is less than or equal to 1000 kJ/m$^3$K.

Owing to the porous ceramic structure according to the present invention, it is possible to achieve a low thermal conductivity, together with installing the porous ceramic structure directly on an object using an adhesive or the like, and further, it is possible to facilitate installation of a bulk body.

BRIEF DESCRIPTION OF THE DRAWINGS

FIG. 8 is a process diagram showing a first method of manufacturing the porous ceramic structure according to an embodiment of the present invention;

FIG. 10 is a process diagram showing a second method of manufacturing the porous ceramic structure according to an embodiment of the present invention;

FIG. 11A is a process diagram showing a state in which the porous ceramic structure is placed on an object, FIG. 11B is a process diagram showing a state in which a sheet is peeled off from the porous ceramic structure, and FIG. 11C is a process diagram showing a state in which a resin material is coated on the porous ceramic aggregate disposed on the object;

DESCRIPTION OF THE PREFERRED EMBODIMENTS

An Example of a porous ceramic structure according to the present invention will be described below with reference to FIGS. 1 to 13B. In the present specification, the tilde symbol "~" which indicates a numerical range is used with the implication that the numerical values written before and after the tilde symbol are included therein as a lower limit value and an upper limit value of the numerical range.

Figure 1:
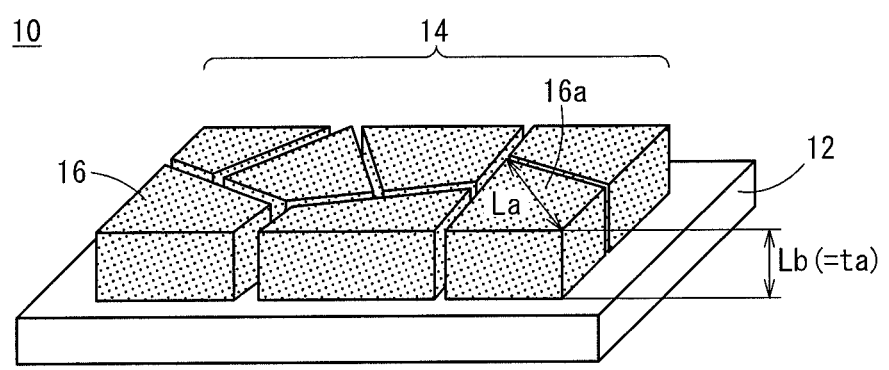
FIG. 1 is a perspective view showing a porous ceramic structure according to an embodiment of the present invention.

As shown in FIG. 1, for example, the porous ceramic structure 10 according to the present embodiment includes one sheet 12, and a porous ceramic aggregate 14 bonded on the sheet 12. The porous ceramic aggregate 14 includes a plurality of separate porous ceramic particles 16. In this instance, the term "bonded" implies that a member is fixed in a peelable state, and refers to a state in which the fixed state is released due to changes that occur over time or by the addition of external factors, whereby a bonded object is separated. Accordingly, a state in which the object is fixed by an adhesive force, and also a state in which the object is firmly fixed temporarily at a bonding interface are included. The sheet 12 and the porous ceramic aggregate 14 may be bonded together using a specialized material such as an adhesive or the like between the sheet 12 and the porous ceramic aggregate 14.

The term "porous" may refer to a state that is neither dense nor hollow, as well as a state composed of a plurality of pores or grains. Moreover, the term "dense" refers to a state in which a plurality of fine grains are bonded without gaps, having no pores. The term "hollow" refers to a state in which the interior is hollow, and in which an outer shell portion thereof is dense.

The porous ceramic particles 16 preferably have an aspect ratio greater than or equal to 3. More preferably, the aspect ratio is greater than or equal to 5, and even more preferably, is greater than or equal to 7. In this case, the aspect ratio is defined by the maximum length La divided by the minimum length Lb, or La/Lb. In this instance, the maximum length La refers to a maximum length on a widest surface (in this case, a single main surface 16a) from among the plurality of surfaces constituting the porous ceramic particles 16. Assuming that the widest surface is a square, a rectangle, a trapezoid, a parallelogram, or a polygon (pentagon, hexagon, etc.), the maximum length La corresponds to the length of a longest diagonal line, whereas if the widest surface is circular, the maximum length La corresponds to the length of a diameter, and if the widest surface is an ellipse, the maximum length La corresponds to the length of a major axis of the ellipse. On the other hand, as shown in FIG. 1, the minimum length Lb refers to the thickness to of the porous ceramic particles 16.

The minimum length Lb preferably is 50~500 µm, more preferably, is 55~400 µm, even more preferably is 60~300 µm, and particularly preferably, is 70~200 µm.

Concerning the sheet 12, for example, a resin-made sheet or a film having an adhesive strength can be used, and a sheet or film is preferable that becomes peelable due to temporal change or due to external factors such as heat, electricity, or external forces or the like.

The porous ceramic aggregate 14 is placed as a bulk body 20 on an object 22, by being coated with a resin material 18 (matrix) such as an adhesive, as will be described later (see FIGS. 11C and 12).

In this case, rather than placing individual porous ceramic particles 16 on the object 22, it is easier to collectively transfer a plurality of the porous ceramic particles 16 together onto the object 22, which also makes it easy to control the gaps between the porous ceramic particles 16.

A planar shape of the porous ceramic aggregate 14 as viewed from the upper surface is preferably the same as the planar shape as viewed from the upper surface of a region of the object 22 where the porous ceramic aggregate 14 is intended to be placed (hereinafter referred to as an installation area of the object 22). In this instance, the installation area of the object 22 is a concept that includes a portion of the object 22. The term "same" as used above includes a case of being entirely the same, or a case of being similar to the planar shape of the installation area of the object 22. In this instance, the similar relationship implies a shape obtained by enlarging the planar shape of the installation region of the object 22 by 1.1~2.0 times, or a shape obtained by reducing such a planar shape by 1.1~2.0 times. In accordance with this feature, a plurality of porous ceramic particles 16 can be transferred onto objects 22 of various shapes without causing a loss of material (a loss of the porous ceramic particles 16).

Further, among the plurality of porous ceramic particles 16 included within the porous ceramic aggregate 14, there may exist at least one porous ceramic particle 16 for which the planar shape as viewed from the upper surface thereof is a polygonal planar shape surrounded by a plurality of straight lines 24 (see FIGS. 2A to 5B). Naturally, the planar shapes of all of the porous ceramic particles 16 may be in the form of polygonal shapes surrounded by a plurality of straight lines 24.

Figure 2C:
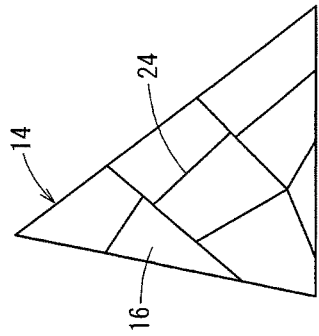
FIG. 2C is a plan view showing an example in which a porous ceramic aggregate is constituted by three types of planar shapes.
Figure 2B:
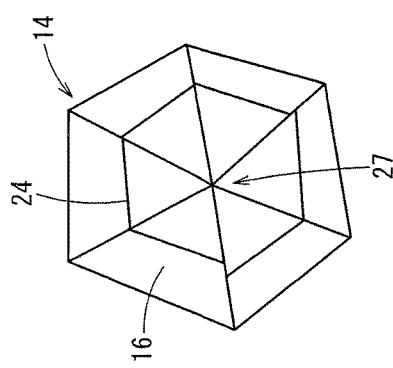
FIG. 2B is a plan view showing an example in which a porous ceramic aggregate is constituted by two types of planar shapes.
Figure 2A:
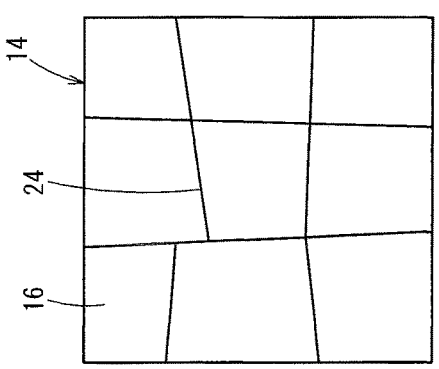
FIG. 2A is a plan view showing an example in which a porous ceramic aggregate is constituted by one type of planar shape.

For example, as shown in FIG. 2A, one type of planar shape may be used, or as shown in FIG. 2B, two types of planar shapes may be used. Further, as shown in FIG. 2C, three types of planar shapes may be used.

In the example of FIG. 2A, a case is shown in which the planar shapes of all of the porous ceramic particles 16 are quadrilateral shapes. In the example of FIG. 2B, a case is shown in which the porous ceramic aggregate 14 is constituted by a combination of quadrilateral shapes and triangular shapes, and an example is shown in which six triangular shapes are arranged on an inner side and six quadrilateral shapes are arranged on an outer side. In FIG. 2C, a case is shown in which the porous ceramic aggregate 14 is constituted by a combination of triangular shapes, quadrilateral shapes, and a pentagonal shape, and an example is shown in which one pentagonal shape, two triangular shapes, and five quadrilateral shapes are arranged thereon.

Figure 3A:
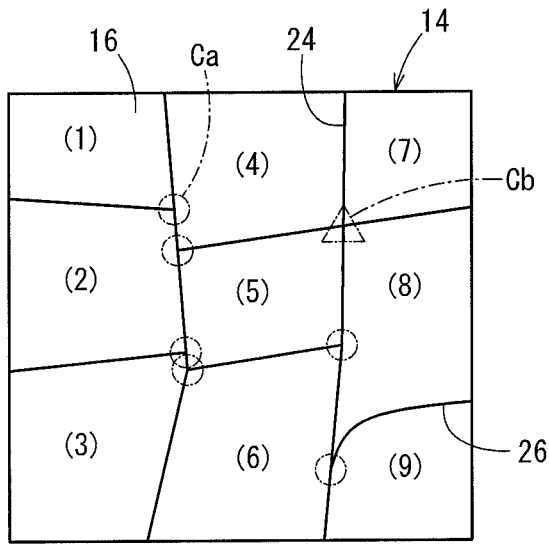
FIG. 3A is a plan view showing an example in which the number of corners at places (cross points Ca) where a corner of a porous ceramic particle faces two other porous ceramic particles is six within the porous ceramic aggregate, and the number of corners at places (cross points Cb) where a corner of a porous ceramic particle faces three other porous ceramic particles is one.
Figure 4A:
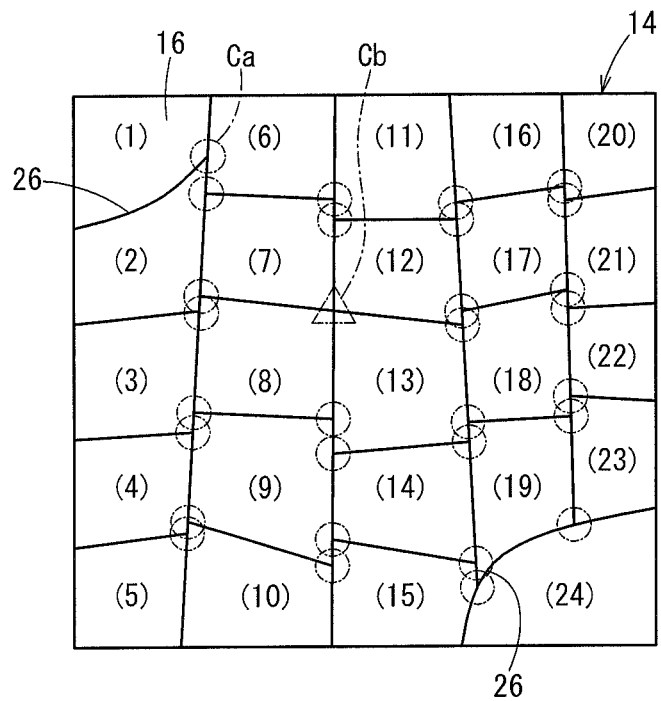
FIG. 4A is a plan view showing an example in which the number of cross points Ca is 29 and the number of cross points Cb is one.

Further, as shown in FIGS. 3A and 4A, among the plurality of porous ceramic particles 16 included within the porous ceramic aggregate 14, a percentage of the porous ceramic particles 16 including a curve 26 in the planar shapes thereof as viewed from the upper surface may be greater than 0% and less than or equal to 50%.

If the planar shapes are solely linear, the porous ceramic particles 16 tend to be easily shifted upon transferring the plurality of porous ceramic particles 16 onto the object 22. However, as a result of the curves 26 existing partially within the porous ceramic aggregate 14, it is unlikely for such shifting to occur, and it also becomes possible to uniformly transfer the plurality of porous ceramic particles 16 onto the object 22.

In the case of determining the percentage of the porous ceramic particles 16 including a curve 26 in the planar shape thereof as viewed from the upper surface, such a percentage may be determined by counting the total number Np of porous ceramic particles 16 on the sheet 12, and the total number Nw of porous ceramic particles 16 including a curve 26 in the planar shape thereof, and then performing the calculation (Number Nw/Number Np)×100(%).

In FIG. 3A, the planar shapes of seven of the porous ceramic particles 16 (the porous ceramic particles 16 indicated by (1) to (7) in FIG. 3A) out of nine of such porous ceramic particles 16 are of a quadrilateral shape, whereas the planar shapes of the remaining two porous ceramic particles 16 (the porous ceramic particles 16 indicated by (8) and (9) in FIG. 3A) have curves 26 therein, respectively. In FIG. 4A, the planar shapes of eighteen of the porous ceramic particles 16 (the porous ceramic particles 16 indicated by (3) to (14), (16) to (18), and (20) to (22) in FIG. 4A) out of twenty-four of such porous ceramic particles 16 are of a quadrilateral shape, whereas the planar shapes of the remaining six porous ceramic particles 16 (the porous ceramic particles 16 indicated by (1), (2), (15), (19), (23) and (24) in FIG. 4A) have curves 26 therein, respectively.

A percentage Fa is defined as the number of corners at places where a corner of a porous ceramic particle 16 faces two other porous ceramic particles 16 with respect to the number of corners of the porous ceramic particles 16 contained in the porous ceramic aggregate 14. Fa is preferably 80% or more. More preferably, Fa is 90% or more. The term "face" indicates a situation where corners face each other with or without a space therebetween. The term "corner" indicates a bent portion of the planar shape as viewed from the upper surface of the porous ceramic particles 16. More specifically, the term "corner" indicates a bent portion that is a place where lines constituting the outline of the planar shape meet, a line and a curve constituting the outline of the planar shape meet, and curves constituting the outline of the planar shape meet, the place being bent.

A place where a corner of a porous ceramic particle 16 faces two other porous ceramic particles 16 is a three-way junction as shown with a cross point Ca. At a four-way junction as a cross point Cb, a corner of a porous ceramic particle 16 faces three other porous ceramic particles 16.

A percentage Fa is worked out as below. Suppose that a total number of corners of all porous ceramic particles 16 contained in the porous ceramic aggregate 14 is Nz; the number of corners at places where a corner of a porous ceramic particle 16 faces two other porous ceramic particles 16 (the number of corners included in all cross points Ca) within the porous ceramic aggregate 14 is Na; and the number of corners located on a peripheral portion of the porous ceramic aggregate 14 is Ne. Fa is worked out with the following equation:

$$Fa = Na/(Nz-Ne) \times 100(\%).$$

Figure 3B:
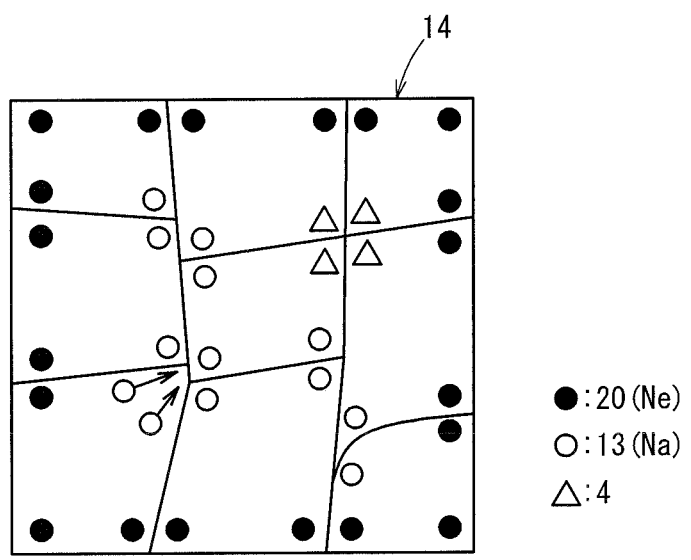
FIG. 3B is an explanatory diagram illustrating the types of corners shown in FIG. 3A.
Figure 4B:
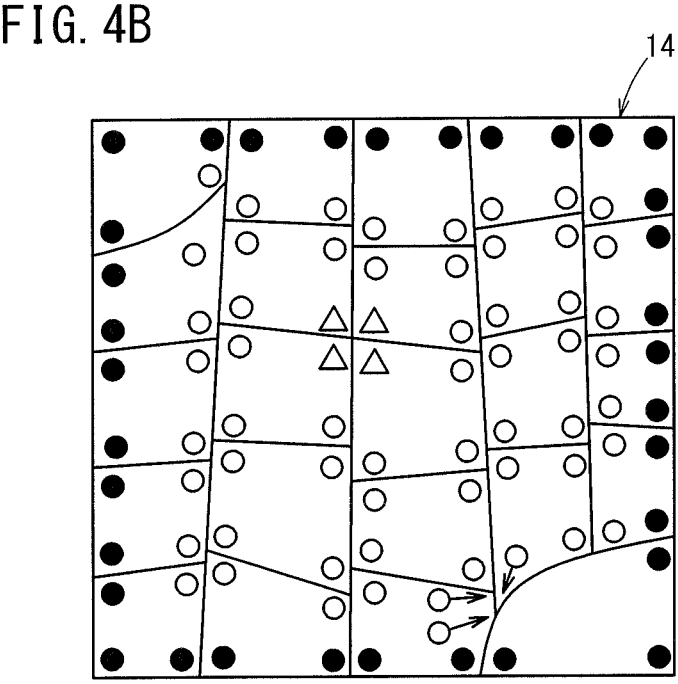
FIG. 4B is an explanatory diagram illustrating the types of corners shown in FIG. 4A.

In FIGS. 3B, 4B; and 5B, corners that are counted as Na are indicated by "○" and corners that are counted as Ne are indicated by "●". Corners indicated by "Δ" are, like the cross points Cb in FIGS. 3A, 4A, and 5A, those included in the cross points at which a corner of a porous ceramic particle 16 faces three other porous ceramic particles 16. Therefore, it is all corners indicated by "○", "●", and "Δ" that are counted as Nz.

In the case of the porous ceramic aggregate 14 of FIGS. 3A and 3B, there are six cross points Ca and one cross point Cb and thus the total number of the cross points Ca and Cb is seven. In this example, as shown in FIG. 3B, Nz=37, Ne=20, and Na=13, whereby the percentage Fa is equal to 76%. In the case of the porous ceramic aggregate 14 of FIGS. 4A and 4B, there are 29 cross points Ca and one cross point Cb and thus the total number of cross points Ca and Cb is 30. In this example, Nz=96, Ne=34, and Na=58, whereby the percentage Fa is equal to 94%.

Figure 5A:
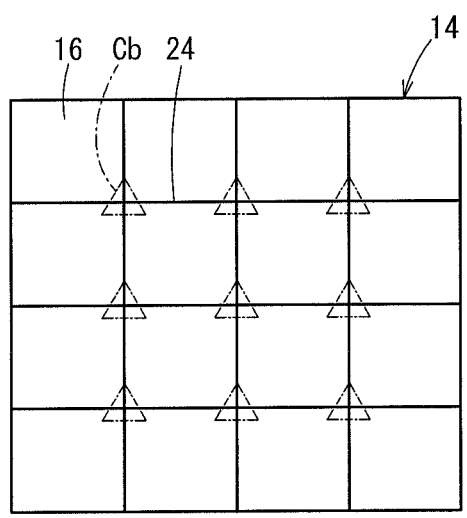
FIG. 5A is a plan view showing an example in which the number of cross points Ca is zero and the number of cross points Cb is nine.
Figure 5B:
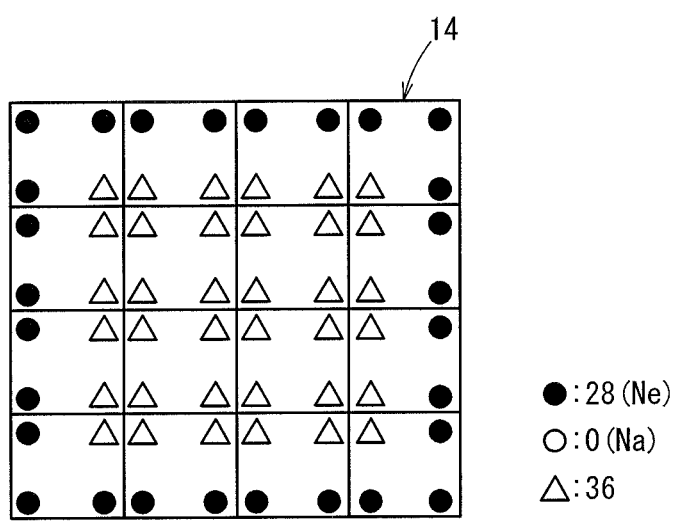
FIG. 5B is an explanatory diagram illustrating the types of corners shown in FIG. 5A.

For comparison, FIGS. 5A and 5B illustrate a porous ceramic aggregate 14 that includes only cross points at which a corner of a porous ceramic particle 16 faces three other porous ceramic particles 16. In this example, only the cross points Cb are present and the number of cross points Cb is nine. Since there are no corners corresponding to the cross point Ca (Na=0), the percentage Fa is equal to 0%.

That is, as the number of places where a corner of a porous ceramic particle 16 faces two other porous ceramic particles 16 increases, the number of cross points Ca and Cb increases. Thus, even if a surface of the object 22 is a curved surface or includes raised and sunken parts, multiple porous ceramic particles 16 can be arranged in accordance with the shape of the surface of the object 22. In addition, because a state is obtained where passages between facing porous ceramic particles 16 branches intricately, it is unlikely for heat transfer through the resin material 18 to occur and the reduction in thermal conductivity can be promoted.

In the examples of FIGS. 5A and 5B, because at least four corners crowd the cross points Cb and there is no cross point Ca and thus the number of cross points reduces in total, a peripheral portion, especially a corner, of the porous ceramic particles 16 is likely to float. Consequently, there is a possibility that the porous ceramic particles 16 are peeled off. According to the present embodiment, on the other hand, multiple porous ceramic particles 16 are arranged in accordance with the shape of the surface of the object 22 and thus there is no possibility that the porous ceramic particles 16 are peeled off.

As shown in FIG. 2B, the porous ceramic aggregate 14 may include a portion 27 in which five or more porous ceramic particles 16 are arranged with one apex each facing toward each other. Owing thereto, the plurality of porous ceramic particles 16 are easily arranged along a surface shape of the object 22, even if curved surfaces or irregularities are formed locally on the surface of the object 22.

Figure 6A:
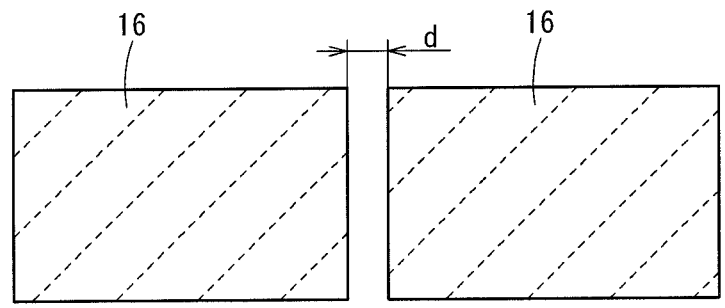
FIG. 6A is a cross-sectional view showing a case in which a gap formed between porous ceramic particles is narrow.
Figure 6B:
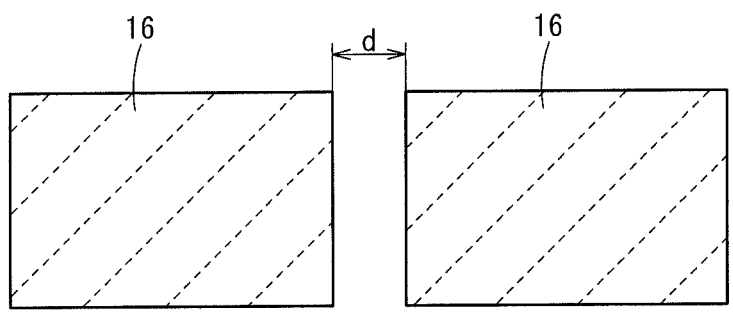
FIG. 6B is a cross-sectional view showing a case in which a gap formed between porous ceramic particles is wide.
Figure 6C:
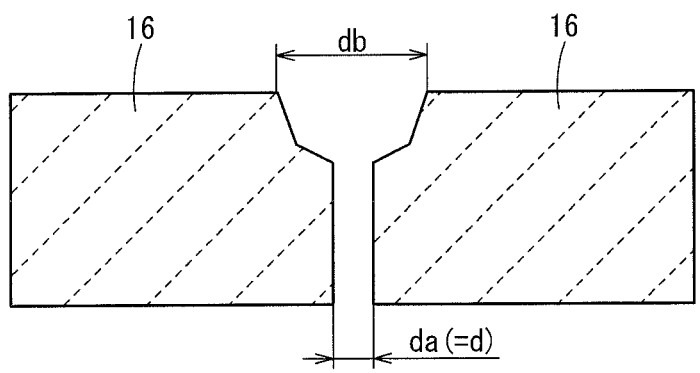
FIG. 6C is a cross-sectional view showing a case in which a gap formed between porous ceramic particles is a mixture of a narrow gap and a wide gap.

It is preferable for the gap d (see FIGS. 6A to 6C) formed between adjacent ones of the porous ceramic particles 16 to be greater than or equal to 0.1 μm and less than or equal to 10 μm. In accordance therewith, it is easy to transfer the plurality of porous ceramic particles 16 onto the object 22, and moreover, it becomes possible to uniformly transfer the plurality of porous ceramic particles 16 onto the object 22. In this instance, the gap d refers to a narrowest gap from among the gaps between adjacent ones of the porous ceramic particles 16. More specifically, with the gap d shown in FIG. 6A and the gap d shown in FIG. 6B, the gap d shown in FIG. 6A is narrow and the gap d shown in FIG. 6B is wide. On the other hand, in the case where a wide gap db and a narrow gap da are mixed, as with the gaps d shown in FIG. 6C, the narrow gap da is defined as the gap d between the porous ceramic particles 16. Such a gap d is obtained by measuring with an optical microscope the space between adjacent ones of the porous ceramic particles 16 in the porous ceramic aggregate 14 that is bonded on the sheet 12.

Figure 7A:
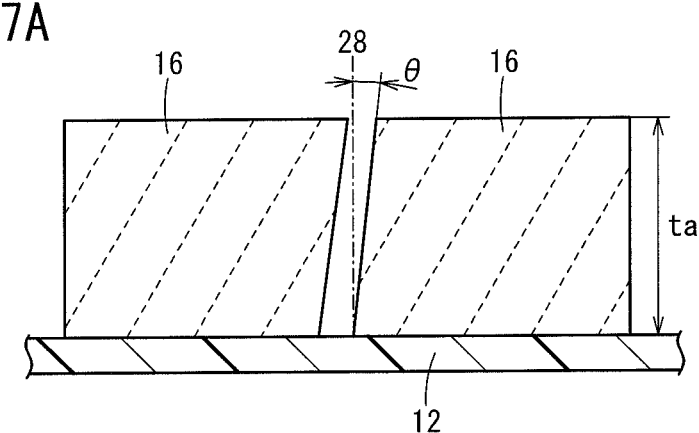
FIG. 7A is a cross-sectional view showing a case in which an angle of inclination of a side surface of the porous ceramic particles is less than or equal to 45 degrees.
Figure 7B:
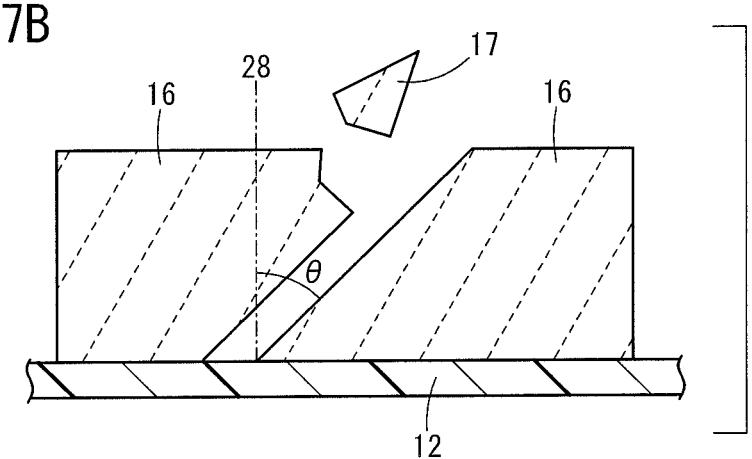
FIG. 7B is a cross-sectional view showing a case in which an angle of inclination of a side surface of the porous ceramic particles is greater than 45 degrees.

Furthermore, as shown in FIG. 7A, among the adjacent porous ceramic particles 16, the angle of inclination θ of the side surface of one of the porous ceramic particles 16 is preferably less than or equal to 45 degrees with respect to a normal line 28 that is normal to the sheet 12, i.e., greater than or equal to 0 degrees and less than or equal to 45 degrees, and more preferably, is greater than 0 degrees and less than or equal to 45 degrees. In the case that the side surfaces of adjacent porous ceramic particles 16 lie parallel to each other, and if the angle of inclination θ is greater than 45 degrees, as shown in FIG. 7B, cases may occur in which the peripheries of the porous ceramic particles 16 become chipped and fragments 17 are scattered. More specifically, by setting the inclination angle θ to be greater than or equal to 0 degrees and less than or equal to 45 degrees, when transferring a plurality of the porous ceramic particles 16 onto the object 22, or when handling the porous ceramic structure 10, the porous ceramic particles 16 are unlikely to become cracked or chipped, and defects are few upon formation of the bulk body 20. Moreover, the aforementioned angle of inclination θ may also include the meaning of a vertical plane. The angle of inclination θ is obtained by measuring with an optical microscope the angle of inclination θ between adjacent ones of the porous ceramic particles 16 in the porous ceramic aggregate 14 that is bonded on the sheet 12.

Figure 7C:
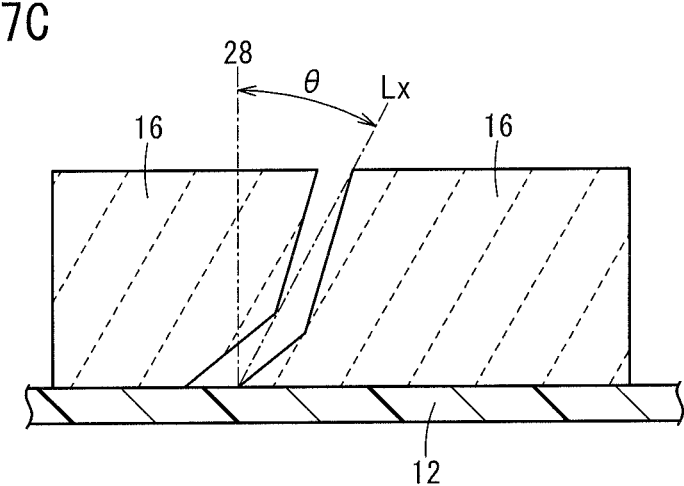
FIG. 7C is an explanatory diagram illustrating a definition of the angle of inclination for a case in which side surfaces of the porous ceramic particle are bent.

Moreover, the gap formed between adjacent porous ceramic particles 16 is not necessarily a linear gap. For example, as shown in FIG. 7C, cases may also occur in which a portion of the gap is bent (bent in a convex shape or bent in a concave shape). In such a case, when viewed in a vertical cross section of the porous ceramic particle 16, the angle of inclination θ is defined by the angle formed between a straight line Lx connecting the upper end and the lower end of the side surface of the porous ceramic particle 16, and the normal line 28 that is normal to the sheet 12.

Further, the number densities of the porous ceramic particles 16 preferably differ by location in the porous ceramic aggregate 14. Further, the sizes of respective planar shapes of the plurality of porous ceramic particles 16 preferably are different.

For example, at a portion where the surface of the object 22 is flat, the number density is small (the size of the porous ceramic particles 16 is large), and at a portion where the surface of the object 22 is a curved surface and within the surrounding vicinity thereof, the number density is large (the size of the porous ceramic particles 16 is small). Hence, when the plurality of porous ceramic particles 16 is transferred onto the object 22, it is possible to arrange the plurality of porous ceramic particles 16 in following relation to the surface of the object 22.

The ratio of the maximum value and the minimum value of the number density (maximum number density/minimum number density) is preferably greater than 1.2.

The number density can be calculated in the following manner. More specifically, in the porous ceramic aggregate 14 that is bonded on the sheet 12, ten arbitrary fields of view are observed with an optical microscope, and the number of porous ceramic particles 16 contained within each field of view is measured. In relation to each of such fields of view, for example, a square region of 3 mm×3 mm can be adopted.

In addition, by dividing the number of the porous ceramic particles 16 included within each measured visual field by the area of the visual field (=9 mm$^2$), the number density per unit area (number/mm$^2$) is calculated. By comparing the number densities corresponding to the ten individual fields of view, the maximum number density and the minimum number density are extracted, and the ratio thereof (maximum number density/minimum number density) is calculated.

Further, the ratio (maximum value/minimum value) of the maximum value and the minimum value of the sizes of the planar shapes of the porous ceramic particles 16 preferably is greater than 1.2.

The sizes of the planar shapes of the porous ceramic particles 16 can be calculated in the following manner. More specifically, in the porous ceramic aggregate 14 that is bonded on the sheet 12, ten arbitrary fields of view are observed respectively with an optical microscope. In addition, for each field of view, five arbitrary straight lines are drawn respectively, and the length of line segments within the porous ceramic particles 16 that cross the straight lines are measured, and an average value thereof is taken to represent the size of the porous ceramic particles 16 within the field of view. The sizes of the porous ceramic particles 16 within the ten fields of view are compared, a maximum value and a minimum value of the sizes of the porous ceramic particles 16 are extracted, and the ratio thereof (maximum value/minimum value) is calculated.

A thickness ta (see FIG. 7A) of the plurality of porous ceramic particles 16 included within the porous ceramic aggregate 14 is preferably less than or equal to 1000 μm, and a variation in the thickness ta is preferably less than or equal to 10%. The thickness ta can be measured using a constant pressure thickness measuring device or the like.

Figure 12:
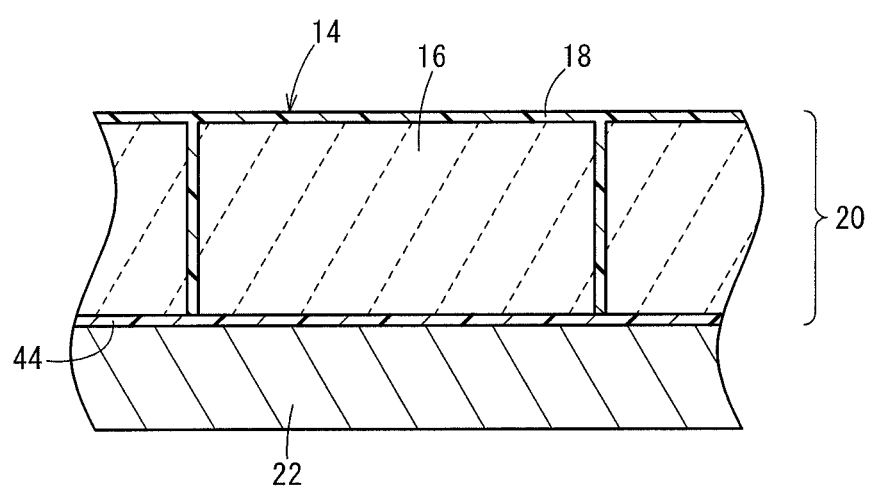
FIG. 12 is a cross-sectional view with partial omission showing a bulk body together with the object.

In accordance with this feature, as shown in FIGS. 11C and 12, in the case that the porous ceramic aggregate 14 is coated entirely with a resin material 18 (matrix) such as an adhesive or the like to thereby form the bulk body 20, coating of the entire porous ceramic aggregate 14 with the resin material 18 is facilitated, and it becomes easy to make the thickness of the resin material 18 on portions of the porous ceramic particles 16 uniform. This also contributes to a lower thermal conductivity of the bulk body 20.

The porosity of the porous ceramic particles 16 preferably is 20%~99%. The pores include at least one of closed pores and open pores, and may include both closed pores and open pores. Further, the shape of the pores, i.e., a surface shape of openings thereof, may be of any shape including a square shape, a quadrilateral shape, a triangular shape, a hexagonal shape, a circular shape, etc., or an irregular shape.

The average pore diameter preferably is less than or equal to 500 nm, and more preferably, is 10~500 nm. This dimension is effective to inhibit the occurrence of lattice vibrations (phonons), which is a primary cause of thermal conductivity.

The porous ceramic particles 16 have a structure in which fine grains are connected in three dimensions. A grain diameter of the fine grains is preferably 1 nm~5 μm. More preferably, the grain diameter is 50 nm~1 μm. The porous ceramic particles 16, which are composed of fine grains having such a grain size range, effectively achieve a low thermal conductivity, since the occurrence of lattice vibrations (phonons), which is a primary cause of heat conduction, is inhibited. The fine grains may be a grain composed of one crystalline grain (a single crystalline grain), or a grain composed of a large number of crystalline grains (a polycrystalline grain). Stated otherwise, the porous ceramic particles 16 preferably are aggregations of fine grains having grain diameters lying within the aforementioned ranges. The grain diameter of the fine grains is determined by measuring, from an image of an electronic microscopic observation, the size (a diameter in the case of spherical grains, or a maximum diameter otherwise) of one grain of the grain groups that make up a framework of the porous ceramic particles 16.

The thermal conductivity of the porous ceramic particles 16 is preferably less than 1.5 W/mK, more preferably, is less than or equal to 0.7 W/mK, even more preferably, is less than or equal to 0.5 W/mK, and particularly preferably, is less than or equal to 0.3 W/mK.

The heat capacity of the porous ceramic particles 16 preferably is less than or equal to 1000 kJ/m$^3$K, more preferably, is less than or equal to 900 kJ/m$^3$K, even more preferably, is less than or equal to 800 kJ/m$^3$K, and particularly preferably, is less than 500 kJ/m$^3$K.

The constituent material of the porous ceramic particles 16 preferably contains a metal oxide, and more preferably, consists only of a metal oxide. This is because, if such a metal oxide is contained therein, the thermal conductivity tends to be lower, due to the fact that the ion binding property between metal and oxygen is stronger compared to the case of a non-oxide (for example, a carbide or nitride) of a metal.

In this case, the metal oxide preferably is an oxide of one element or a composite oxide of two or more elements selected from the group consisting of Zr, Y, Al, Si, Ti, Nb, Sr, La, Hf, Ce, Gd, Sm, Mn, Yb, Er, and Ta. This is because, if the metal oxide is an oxide or a composite oxide of such elements, heat conduction due to lattice vibrations (phonons) is unlikely to occur.

Specific examples of the material include $ZrO_2$—$Y_2O_3$ to which $Gd_2O_3$, $Yb_2O_3$, $Er_2O_3$, etc., is added. As further specific examples thereof, there may be cited $ZrO_2$—$HfO_2$—$Y_2O_3$, $ZrO_2$—$Y_2O_3$—$La_2O_3$, $ZrO_2$—$HfO_2$—$Y_2O_3$—$La_2O_3$, $HfO_2$—$Y_2O_3$ $CeO_2$—$Y_2O_3$, $Gd_2Zr_2O_7$, $Sm_2Zr_2O_7$, $LaMnAl_{11}O_{19}$, $YTa_3O_9$, $Y_{0.7}La_{0.3}Ta_3O_9$, $Y_{1.08}Ta_{2.76}Zr_{0.24}O_9$, $Y_2Ti_2O_7$, $LaTa_3O_9$, $Yb_2Si_2O_7$, $Y_2Si_2O_7$, $Ti_3O_5$, and the like.

Figure 9:
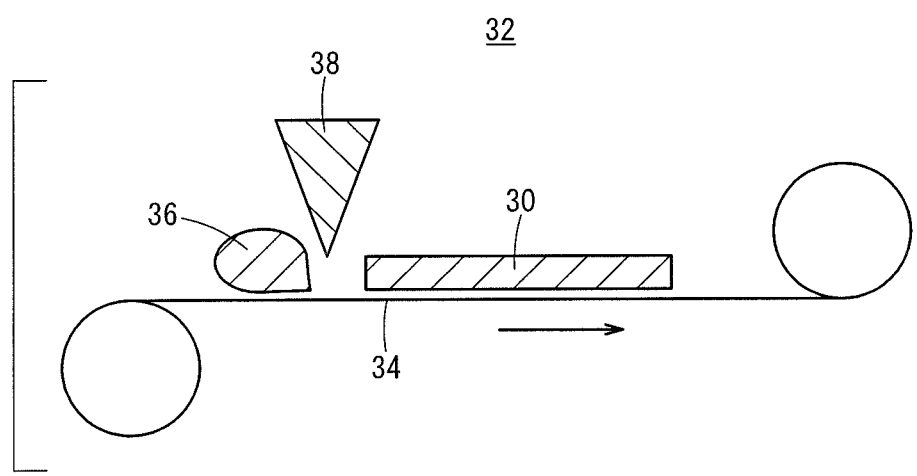
FIG. 9 is a schematic diagram showing an example of a doctor blade device.

Next, with reference to FIGS. 8 to 10, a first manufacturing method and a second manufacturing method for manufacturing the porous ceramic structure 10 will be described.

Initially, the first manufacturing method will be described. First, in step S1 of FIG. 8, a pore forming agent, a binder, a plasticizer, and a solvent are added to and mixed with a constituent material powder of the aforementioned porous ceramic particles 16 in order to prepare a casting slurry 36 (see FIG. 9).

Thereafter, in step S2, the casting slurry 36 is subjected to a vacuum defoaming treatment, whereby the viscosity of the slurry is adjusted, followed by carrying out tape casting in order to manufacture a cast body 30 (green sheet, green body) (green body manufacturing step). For example, as shown in FIG. 9, the casting slurry 36 is introduced onto a ceramic release type polyester film 34 of a doctor blade device 32, and the cast body 30 (green sheet) is manufactured by a doctor blade 38, such that a thickness thereof becomes a specified thickness after firing.

Thereafter, in step S3 of FIG. 8, the cast body 30 (green sheet) is separated from the polyester film 34 and picked up. Since the surface of the ceramic release type polyester film 34 is a mirror surface, from among the surface of the cast body 30, the surface from which the polyester film 34 has been peeled (hereinafter referred to as a peeled surface 30a) also becomes a mirror surface.

Thereafter, in step S4, the picked cast body 30 is fired, whereby a sheet-shaped sintered body 40 is obtained (firing step). Next, in step S5, the sintered body 40 is bonded on the sheet 12 (bonding step). As noted above, the peeled surface 30a of the cast body 30 is in the form of a mirror surface, and therefore, an end surface 40a of the sintered body 40 (the surface of the peeled surface 30a) after the firing process also is in the form of a mirror surface. Accordingly, by bonding the end surface 40a of the sintered body 40 on the sheet 12, the sintered body 40 becomes bonded firmly to the sheet 12.

Thereafter, in step S6, the sintered body 40 is divided into a plurality of porous ceramic particles 16 (dividing step). Consequently, a porous ceramic structure 10 having one sheet 12, and a porous ceramic aggregate 14 bonded to the sheet 12 and made up of a plurality of porous ceramic particles 16 is obtained. A surface modification treatment may be performed on the sintered body 40 after the firing step, or may be performed on the porous ceramic particles 16 after the dividing step. Such a surface modification treatment is a treatment (principally a treatment to make permeation of the resin material unlikely) for controlling the degree of penetration of the resin material 18 (matrix: see FIGS. 11C and 12) such as an adhesive or the like into the porous ceramic particles 16.

The above-described dividing step in step S6 divides the sintered body 40 into a plurality of small pieces, or stated otherwise, a plurality of porous ceramic particles 16. Of course, in the dividing step, such division can be carried out by various methods. For example, a knife may be pressed against the sintered body 40 in order to cut (divide) the sintered body 40 into a plurality of porous ceramic particles 16, or the sintered body 40 may be cut with a laser into a plurality of the porous ceramic particles 16, or the like. In this case, from the fact that the sintered body 40 is firmly bonded to the sheet 12, when division is performed, peeling of the sintered body 40 and the porous ceramic particles 16 from the sheet 12 is prevented.

Next, the second manufacturing method will be described with reference to FIG. 10. In the second manufacturing method, in steps S101 to S103, in the same manner as in the aforementioned steps S1 to S3, preparation of the casting slurry 36, manufacturing of the cast body 30, and picking up of the cast body 30 are performed.

Thereafter, in step S104, by carrying out laser machining or press machining, a plurality of cutting lines (cuts) 42 are formed from the upper surface of the cast body 30.

Thereafter, in steps S105 to S107, in the same manner as in the aforementioned steps S4 to S6, the picked cast body 30 is fired, whereby a sheet-shaped sintered body 40 is obtained. In addition, the sintered body 40 is bonded onto the sheet 12 and divided into a plurality of the porous ceramic particles 16.

Consequently, a porous ceramic structure 10 having one sheet 12, and a porous ceramic aggregate 14 bonded to the sheet 12 and made up of a plurality of porous ceramic particles 16 is obtained. Moreover, in the second manufacturing method as well, a surface modification treatment may be performed on the sintered body 40 after the firing step, or may be performed on the porous ceramic particles 16 after the dividing step.

Next, a method of constructing a single bulk body 20 using the porous ceramic structure 10 will be described with reference to FIGS. 11A to 11C and 12.

First, as shown in FIG. 11A, an adhesive 44 is coated on the object 22. The porous ceramic structure 10 is placed on the adhesive 44 that has been coated on the object 22. In this case, the porous ceramic structure 10 is placed in such a manner that the adhesive 44 on the object 22 and the porous ceramic aggregate 14 face toward each other.

Then, as shown in FIG. 11B, for example, the sheet 12 is heated and the sheet 12 is peeled off, whereby the porous ceramic aggregate 14 is transferred onto the adhesive 44 of the object 22.

Thereafter, as shown in FIGS. 11C and 12, the porous ceramic aggregate 14 is coated entirely with a resin material 18 (matrix) such as an adhesive or the like, thereby forming the bulk body 20. More specifically, the bulk body 20 is installed on the object 22.

Figure 13A:
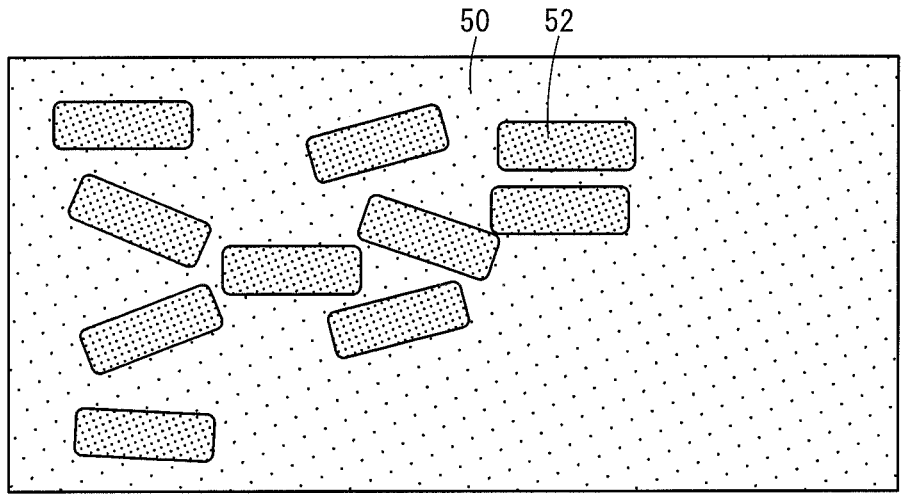
FIG. 13A is an explanatory diagram with partial omission showing a state in which a plurality of particles are dispersed in a slurry according to a conventional example.
Figure 13B:
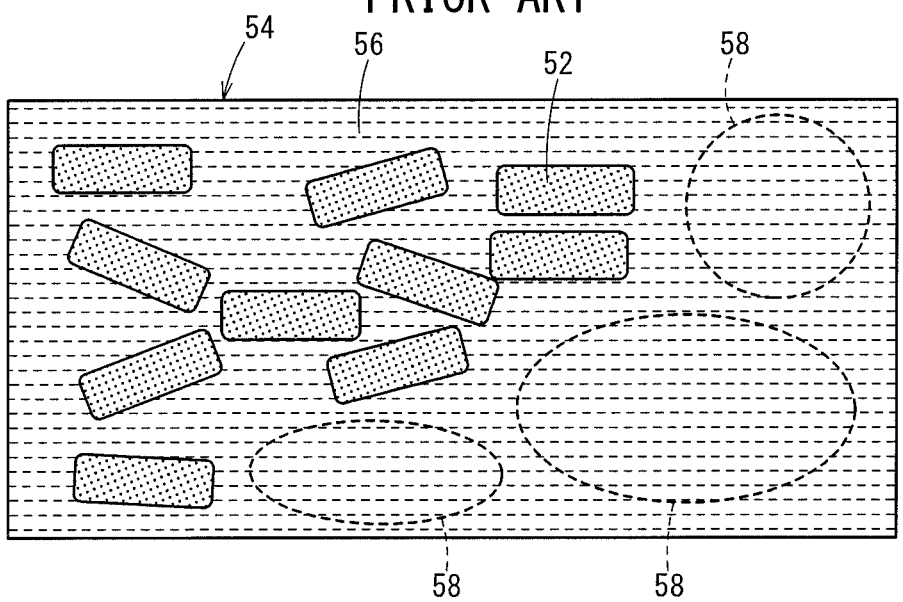
FIG. 13B is an explanatory diagram with partial omission showing a state in which the slurry is dried, fired, and solidified into a bulk body.

Conventionally, as shown in FIG. 13A, since particles 52 added to a slurry 50 are small, it is difficult to uniformly disperse the particles 52 in the slurry 50. Therefore, as shown in FIG. 13B, when the slurry 50 is solidified into a bulk body 54, due to the fact that the plurality of particles 52 are not uniformly dispersed in the adhesive 56 upon solidification of the slurry 50, many regions 58 exist where only the adhesive 56 is present, which has a thermal conductivity higher than that of the particles 52, and thus, the reduction in thermal conductivity of the bulk body 54 is insufficient.

In contrast thereto, in the present embodiment, the porous ceramic structure 10, which includes the porous ceramic aggregate 14 composed of the plurality of porous ceramic particles 16 bonded on the sheet 12, is placed on the object 22. Thereafter, the sheet 12 is peeled off, and the porous ceramic aggregate 14 is transferred onto the object 22. Then, the porous ceramic aggregate 14 is coated with the resin material 18 (matrix) such as an adhesive or the like to thereby constitute the bulk body 20.

Therefore, it is possible to uniformly disperse and arrange the plurality of porous ceramic particles 16 in the resin material 18. In addition, since regions composed of only the resin material 18 having a thermal conductivity higher than that of the porous ceramic particles 16 are narrowed, the thermal conductivity of the bulk body 20 can be suppressed and remain low. Moreover, the thermal conductivity can be equalized within the bulk body 20, there is no need to change or modify the bulk body 20 corresponding to the location where the bulk body 20 is installed, the process of arranging the bulk body 20 can be simplified, and the number of steps required therefor can be reduced.

Further, since the sintered body 40 bonded to the sheet 12 is divided into a plurality of porous ceramic particles 16, unlike the case of the conventional technique, a plurality of the porous ceramic particles 16 can be arranged uniformly on the object 22. In addition, even in the case that the surface of the object 22 is of an irregular shape (warped or the like) or a curved surface, the plurality of porous ceramic particles 16 can be easily arranged along a surface shape of the object 22, and the degree of freedom of design can be enhanced. Further, since the porous ceramic structure 10 is composed of the sheet 12 and the porous ceramic aggregate 14 having the plurality of porous ceramic particles 16 that are bonded on the sheet 12, handling of the porous ceramic structure 10 is facilitated, while in addition, the operation of transferring the plurality of porous ceramic particles 16 onto the object 22 is simplified. This is advantageous in terms of simplifying the manufacturing process.

Preferably, the adhesive strength (JIS 20237) of the sheet 12 is greater than or equal to 1.0 N/10 mm, the tensile elongation (JIS K7127) of the sheet 12 is greater than or equal to 0.5%, and the thickness of the sheet 12 is less than or equal to 5 mm. Consequently, the following effects can be obtained.

(a) The higher the adhesive strength, the more firmly the porous ceramic particles 16 can be fixed.

(b) As the tensile elongation increases, it is possible to follow the curved surface.

(c) As the thickness thereof is thinner, it becomes easier to follow the curved surface.

In greater detail, the adhesive strength of the sheet 12 exhibits the following properties. More specifically, the adhesive strength at the time that the porous ceramic particles 16 are retained is greater than or equal to 1.0 N/10 mm, and the adhesive strength at the time of peeling the porous ceramic particles 16 is less than or equal to 0.1 N/10 mm.

The method of evaluating the adhesive strength of the sheet 12 is the same as the method used for evaluating the adhesive strength of an adhesive tape. In particular, the sheet 12 is attached to a stainless steel plate, and the sheet 12 is pulled at an angle of 180 degrees or 90 degrees, whereupon the force applied when peeling the sheet 12 off from the stainless steel plate is regarded as the adhesive force (adhesive strength).

Further, the sheet 12 is formed by applying an adhesive to a base material (support). In this case, as the type of base material, preferably a material is selected from among the following.

More specifically, when the porous ceramic particles 16 are transferred onto the planar object 22, it is preferable to use a film, metal foil, paper, or the like as the base material. In this case, since the base material of the sheet 12 is stiff, it is possible to dispose the sheet 12 in the form of a film without wrinkles with respect to the planar object 22.

In the case of transferring the porous ceramic particles 16 onto an object 22 having a curved surface (convex surface, concave surface, irregular surface) shape, it is preferable to use a cloth, a rubber sheet, foam or the like as the base material. In this case, since the base material of the sheet 12 is soft and stretchable, it is possible to dispose the sheet 12 in following relation to the curved surface shape of the object 22.

Further, by application of heat, water, a solvent, light (ultraviolet light), or microwaves, the adhesive strength of the sheet 12 can be weakened and the sheet 12 can be easily peeled off. At this time, the adhesive strength of the sheet 12 is preferably weaker than the adhesive strength of the adhesive 44 that is used between the object 22 and the porous ceramic structure 10.

EXAMPLES

A confirmation was carried out concerning the thermal conductivity and ease of following the curved surface concerning the bulk bodies 20, for cases in which the bulk bodies 20 were constituted using the porous ceramic structures 10 according to Examples 1 and 2, the porous ceramic structures according to Reference Examples 1 and 2, and the porous ceramic structures according to Comparative Examples 1 and 2.

Example 1

Porous ceramic particles 16 each having a porosity of 60% and a thickness of 60 μm were used as the plurality of porous ceramic particles 16 constituting the porous ceramic structure 10, and a bulk body 20 according to Example 1 was prepared according to the above-described first manufacturing method. More specifically, at first, a porous ceramic structure 10 including a sheet 12 and a plurality of porous ceramic particles 16 bonded to one surface of the sheet 12 was used. Then, after coating an adhesive 44 (thermal conductivity 2 W/mK) onto an object 22, the plurality of porous ceramic particles 16 were transferred onto the adhesive 44 of the object 22 using the sheet 12, and by application of heat thereto, the sheet 12 was peeled off. After coating the transferred particles on the object with a resin material 18 (matrix) from above, the resin material 18 was solidified, and the bulk body 20 was installed on the surface of the object 22.

<Manufacturing of Porous Ceramic Structure 10>

In Example 1, a porous ceramic structure 10 for use in measuring porosity, and a porous ceramic structure 10 for use as a bulk body were manufactured in the following manner. The porous ceramic structures of the later-described Example 2, References Examples 1, 2, and Comparative Examples 1, 2 were also manufactured in a similar manner.

First, a pore forming agent (latex particles or melamine resin particles), a polyvinyl butyral resin (PVB) as a binder, DOP (dioctyl phthalate) as a plasticizer, and xylene and 1-Butanol as solvents were added to yttria-partially-stabilized zirconia powder, and mixed in a ball mill for 30 hours in order to prepare a casting slurry 36. The casting slurry 36 was subjected to a vacuum defoaming treatment, whereby the viscosity thereof was adjusted to 4000 cps, and thereafter, the cast body 30 (green sheet) was produced by the doctor blade device 32 such that a thickness thereof after firing was 60 μm. Thereafter, the cast body 30 was fired at 1100° C. for 1 hour in order to obtain the sintered body 40. Thereafter, the sintered body 40 was bonded onto the upper surface of the sheet 12. Furthermore, the sintered body 40 was divided into a plurality of the porous ceramic particles 16. More specifically, a porous ceramic structure 10 was manufactured, in which a porous ceramic aggregate 14 made up of a plurality of porous ceramic particles 16 was bonded on the sheet 12.

The planar shape of the porous ceramic aggregate 14 on the sheet 12 is a square shape having a length of 100 mm and a width of 100 mm, and the porous ceramic structure 10 is formed in a state with roughly 40000 of the porous ceramic particles 16 being arrayed on the sheet 12.

In the case of the porous ceramic structure 10 according to Example 1, the percentage Fa has been 90%. The percentage Fa is defined as the number of corners at places where a corner of a porous ceramic particle 16 faces two other porous ceramic particles 16 with respect to the number of corners of the porous ceramic particles 16 contained in the porous ceramic aggregate 14.

Example 2

The bulk body 20 according to Example 2 was manufactured in the same manner as in Example 1, except for the feature that, as the porous ceramic structure 10, the percentage Fa is 80%.

Reference Example 1

The bulk body 20 according to Reference Example 1 was manufactured in the same manner as in Example 1, except for the feature that the percentage Fa is 70%, as the porous ceramic structure 10.

Reference Example 2

The bulk body 20 according to Reference Example 2 was manufactured in the same manner as in Example 1, except for the feature that, as the porous ceramic structure 10, the percentage Fa is 50%.

Comparative Example 1

The bulk body 20 according to Comparative Example 1 was manufactured in the same manner as in Example 1, except for the feature that, as the porous ceramic structure 10, a porous ceramic structure 10 was used in which there is no place where a corner of a porous ceramic particle 16 faces two other porous ceramic particles 16 (that is, the cross point Ca), and that the plurality of porous ceramic particles 16 are arranged in a lattice form.

Comparative Example 2

As illustrated in FIG. 13A, the bulk body 54 according to Comparative Example 2 was manufactured by preparing a slurry 50 containing particles 52 (commercially available porous ceramic particles) having a porosity of 90% and a particle diameter of 50 μm, polystyrene resin fine particles, and water, and thereafter pouring the slurry 50 into a mold, and then after drying, performing firing and solidifying to obtain the bulk body 54.

[Measurement Method, Method of Calculation, and Evaluation Standards]

<Measurement of Porosity>

With respect to Examples 1 and 2, Reference Examples 1 and 2, and Comparative Example 1, ten porous ceramic particles 16 were selected at random from among the plurality of porous ceramic particles 16 constituting a porous ceramic structure 10 for use in measuring porosity, and the selected porous ceramic particles 16 were embedded in a resin. The resin was polished until producing an observation site at which the porous ceramic particles 16 could be observed with an electron microscope, to thereby obtain a resin-filled polished surface. Then, an electron microscopic observation (image analysis) was performed on the resin-filled polished surface. From such an image analysis, the respective porosities of the ten porous ceramic particles 16 were calculated, and the average value of the ten porous ceramic particles 16 was taken as the porosity of the porous ceramic particles 16.

<Measurement of Average Pore Diameter>

The average pore diameter of the porous ceramic particles 16 was measured using an automated porosimeter (trade name "Autopore 9200") manufactured by Shimadzu Corporation.

<Method of Measuring Thermal Conductivity of Bulk Body 20 and Evaluation Criteria>

At first, the density of the bulk body 20 was measured with a mercury porosimeter. Next, the specific heat of the bulk body 20 was measured using a DSC (Differential Scanning Calorimeter) method. Next, the thermal diffusivity of the bulk body 20 was measured using a laser flash method. Thereafter, the thermal conductivity of the bulk body 20 was calculated from the following relational expression:

Thermal Diffusivity×Specific Heat×Density=Thermal Conductivity

Then, based on the following evaluation criteria, the thermal conductivities of Examples 1 and 2, Reference Examples 1 and 2, and Comparative Examples 1 and 2 were evaluated.

A: Less than or equal to 0.9 W/mK
B: Greater than or equal to 1.0 W/mK and less than or equal to 1.4 W/mK
C: Greater than or equal to 1.5 W/mK and less than or equal to 1.9 W/mK
D: Greater than or equal to 2.0 W/mK

[Evaluation of Ease of Following Curved Surface of Object 22]

The number Nb of the porous ceramic particles 16 whose peripheral portion remains floating, from among the porous ceramic particles 16 existing on the object 22 was confirmed with an optical microscope, and the percentage of the number Nb with respect to the total number Nz of porous ceramic particles 16 on the sheet 12, or more specifically, the value (Number Nb/Total Number Nz)×100(%), was determined. In addition, Examples 1 and 2, Reference Examples 1 and 2, and Comparative Example 1 were evaluated on the basis of the following Evaluation Standards. Comparative Example 2 was excluded from this evaluation because Comparative Example 2 pertains to the bulk body 54 that contains particles 52 having a particle diameter of 50 μm in the adhesive 56, not by nature a configuration where the particles 52 are bonded to the object 22.

A: Less than 3%
B: Greater than or equal to 3% and less than 5%
C: Greater than or equal to 5% and less than 10%
D: Greater than or equal to 10%

<Evaluation Results>

Evaluation results of Examples 1 and 2, Reference Examples 1 and 2, and Comparative Examples 1 and 2 are shown below in Table 1.

TABLE 1

| Content | | Low Thermal Conductivity | Ease of Following Curved Surface |
|---|---|---|---|
| Example 1 | Na/(Nz − Ne) × 100 = 90% | A | A |
| Example 2 | Na/(Nz − Ne) × 100 = 80% | A | B |
| Reference Example 1 | Na/(Nz − Ne) × 100 = 70% | B | C |
| Reference Example 2 | Na/(Nz − Ne) × 100 = 50% | B | C |
| Comparative Example 1 | There is no cross point Ca. (lattice shaped) | C | D |
| Comparative Example 2 | Particles having a particle diameter of 50 μm are dispersed in the adhesive. | D | — |

As can be understood from Table 1, in Comparative Example 2, the thermal conductivity was greater than or equal to 2.0 W/mK. In the bulk body 54 according to Comparative Example 2, it is considered that the reason the thermal conductivity was increased is because there were many regions 58 in which only the adhesive 56 was present. In Comparative Example 1 as well, the thermal conductivity was greater than or equal to 1.5 W/mK. This is considered to be due to the fact that, since passages between the porous ceramic particles 16 facing each other extend linearly over the entire porous ceramic aggregate 14 in the bulk body 54 according to Comparative Example 1, it is likely for heat transfer through the resin material 18 to occur.

In contrast thereto, in Examples 1 and 2 and Reference Examples 1 and 2, the thermal conductivity was low at less than or equal to 1.4 W/mK, and in particular, in Examples 1 and 2, the thermal conductivity was extremely low at 0.9 W/mK. This is considered to be due to the fact that, since passages between facing porous ceramic particles 16 branches intricately, it is unlikely for heat transfer through the resin material 18 to occur and the reduction in thermal conductivity has been promoted.

Among Examples 1 and 2, Reference Examples 1 and 2, and Comparative Example 1, concerning the easiness of following the curved surface of the object 22, Examples 1 and 2 have been highly rated while Example 1 has been most highly rated. Concerning Reference Examples 1 and 2, because the percentage Fa is less than 80%, it is considered that there have been a small number of cross points Ca and Cb and thus the easiness of following the curved surface of the object 22 has lowered.

The porous ceramic structure according to the present invention, are not limited to the above-described embodiments, and it is a matter of course that various configurations can be adopted therein without departing from the scope of the present invention.

In the above examples, the porous ceramic aggregate 14 is coated with the resin material 18 when the bulk body 20 is manufactured. However, alternatively, a portion of the porous ceramic aggregate 14 may be coated with the resin material 18 to thereby form the bulk body 20, or the bulk body 20 may be formed merely by installing the porous ceramic aggregate 14 on the object 22 without using the resin material 18.

What is claimed is:

1. A porous ceramic structure comprising: a porous ceramic aggregate including at least a plurality of porous ceramic particles, wherein a percentage of the number of corners at places where a corner of a porous ceramic particle faces two other porous ceramic particles with respect to the number of corners of the porous ceramic particles contained in the porous ceramic aggregate is 80% or more, wherein the porous ceramic particles have an average pore diameter of less than or equal to 500 nm, wherein a thermal conductivity of the porous ceramic particles is less than 1.5 W/mK, and wherein a heat capacity of the porous ceramic particles is less than or equal to 1000 kJ/m$^3$K.

2. The porous ceramic structure according to claim 1, wherein $$Na/(Nz-Ne) \times 100(\%) \geq 80(\%)$$

where Nz is a total number of corners of all the porous ceramic particles contained in the porous ceramic aggregate, Na is the number of corners at places where a corner of a porous ceramic particle faces two other porous ceramic particles within the porous ceramic aggregate, and Ne is the number of corners located on a peripheral portion of the porous ceramic aggregate.

3. The porous ceramic structure according to claim 2, wherein $$Na/(Nz-Ne) \times 100(\%) \geq 90(\%).$$

4. The porous ceramic structure according to claim 1, comprising:
one sheet; and
the porous ceramic aggregate bonded on the sheet.

5. The porous ceramic structure according to claim 1, wherein a porosity of the porous ceramic particles is 20% to 99%.

* * * * *